Figure 1:
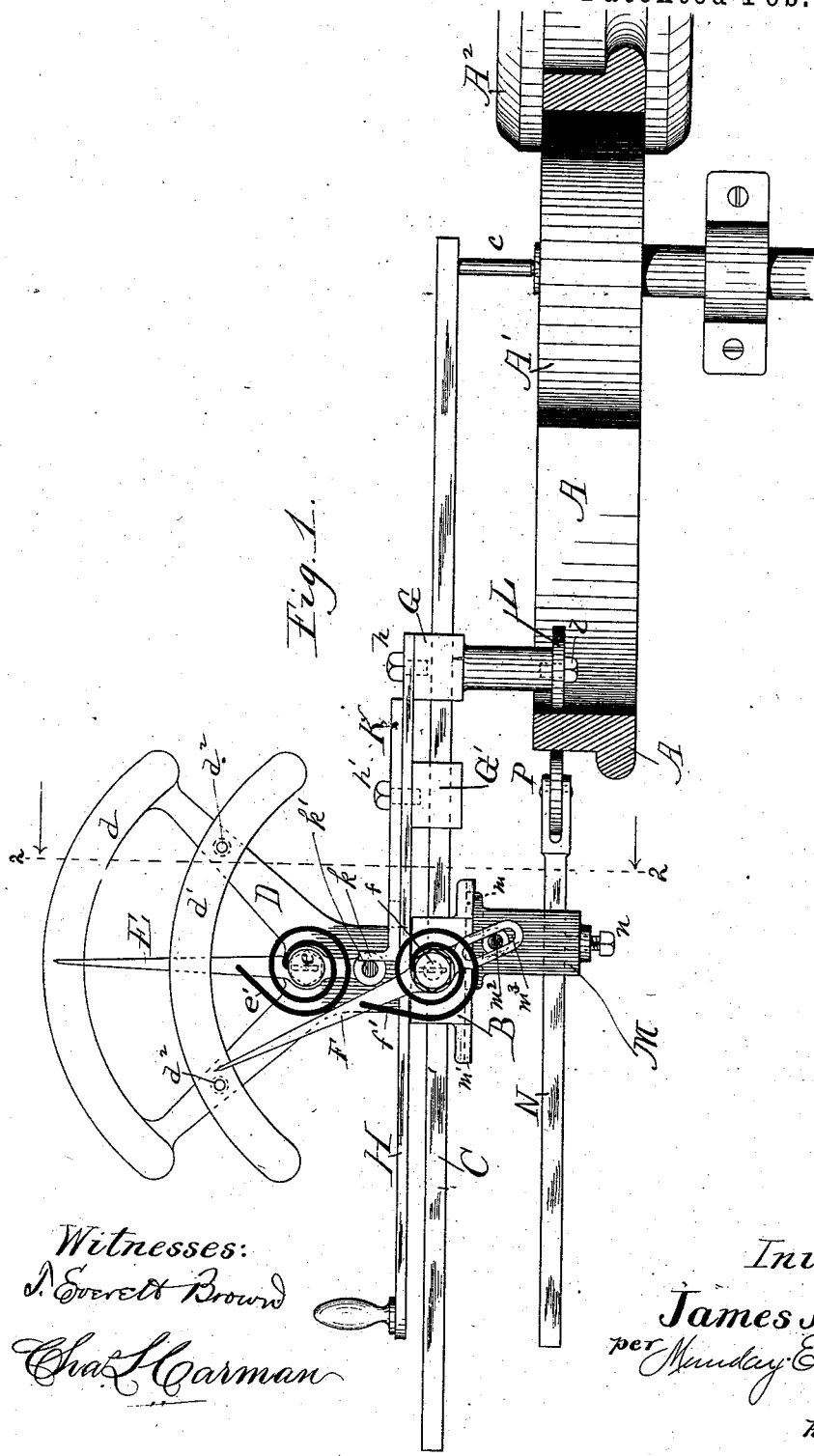

(No Model.)
2 Sheets—Sheet 1.

J. MUNTON.
INDICATOR FOR TIRE ROLLING APPARATUS.

No. 293,768. Patented Feb. 19, 1884.

Witnesses:
J. Everett Brown
Chas. L. Carman

Inventor:
James Munton
per Munday Evarts and Adcock
his Attorneys.

(No Model.) 2 Sheets—Sheet 2.
J. MUNTON.
INDICATOR FOR TIRE ROLLING APPARATUS.
No. 293,768. Patented Feb. 19, 1884.

Fig 2.

Witnesses:
J. Everett Brown
Chas. L. Carman

Inventor:
James Munton
per Munday, Evarts, and Adcock
his Attorneys:

UNITED STATES PATENT OFFICE.

JAMES MUNTON, OF CHICAGO, ILLINOIS.

INDICATOR FOR TIRE-ROLLING APPARATUS.

SPECIFICATION forming part of Letters Patent No. 293,768, dated February 19, 1884.

Application filed September 18, 1883. (No model.)

*To all whom it may concern:*

Be it known that I, JAMES MUNTON, a subject of the Queen of Great Britain, residing in Chicago, in the county of Cook and State of Illinois, have invented a new and useful Improvement in Indicators for Tire-Rolling Apparatus, of which the following is a specification.

Heretofore in rolling tires for locomotive-engine wheels, &c., it has been customary to employ a gage-arm having a roller which bears against the interior surface of the tire, which arm projects against a stop fixed at a point to indicate when the tire has been rolled to the desired interior diameter; but, owing to unavoidable variations in the blooms from which the tires are rolled, they will not always have the same exterior diameter or thickness, though they are rolled to the same interior diameter. It has been customary, therefore, after the tire has been rolled to the required interior diameter, to turn its periphery down to the requisite exterior diameter. This not only involves labor and expense, but materially diminishes the durability of the tire, as the surface left on the periphery or tread of the tire by the rolls is harder and more durable than a turned surface, and after this chilled or hardened surface left by the rolls is once turned or worn off the tire will wear away much more rapidly; but the chief difficulty that has been experienced with the method heretofore in use is that often, after a bloom has been rolled into a tire of given interior diameter, it will be found that the tire is too thin or of too small exterior diameter to be used, thus occasioning great loss of work and metal, and sometimes, too, after the tire has been rolled to the required interior diameter, it will be found to be much too thick, and therefore require a great deal of labor and loss of metal in turning it down to the requisite exterior diameter.

It is the object of the present invention to provide a device for simultaneously indicating while the tire is being rolled both its interior and exterior diameters, as well as its thickness, so that if the bloom should be too small to make a tire of the desired size it may be utilized before it is spoiled or rolled too thin in making a tire of smaller diameter; or if the bloom should be too large and the tire much too thick after it is rolled to the required interior diameter, this being at once indicated by my invention, the rolling may be further continued so as to produce a tire of larger size, and thus save the labor and expense of turning it down. It will of course here be understood that tires for locomotive or car wheels are required to be made in pairs, each wheel of each pair requiring to be of precisely the same diameter and thickness. As by my invention I indicate both the exterior and interior diameters of the tire, I am enabled to roll it accurately to the required exterior diameter, so that it will require no turning, thus enabling me to preserve its chilled or hardened tread as left by the rolls.

In the accompanying drawings, which form a part of this specification, and in which similar letters of reference indicate like parts, Figure 1 is a side elevation of a device embodying my invention, and Fig. 2 is a cross-section on line 2 2 of Fig. 1.

In said drawings, A represents the tire as it is being rolled between the rolls A' and A², of which the former is the inner or movable roll and the latter the exterior or fixed roll.

B represents an adjustable slide, mounted on the straight rod or bar C, and provided with a set-screw, $b$, by means of which it may be fixed at any desired point on said rod. The slide B is provided with an arm, D, which is furnished with an arc or dial, $d$, and to which a second arc or dial, $d'$, is secured by the pins $d^2$ $d^2$.

E represents an index finger or lever, pivoted to the arm D by the pin $e$. This index-finger is provided with a coil-spring, $e'$, one end of this spring being inserted in the index-finger, and the other in the pin $e$, on which said finger is mounted.

F is a second index finger or lever, pivoted to the slide B by means of the pin or screw $f$. This index-finger is also provided with a coil-spring, $f'$, similar to the spring $e'$ of the index-finger E.

G and G' are slides mounted on the rod C, to which slides the handle-bar H is secured by the set-screws $h$ $h'$; and K is an adjustable slotted plate, secured to said handle-bar H by the set-screw $h'$, which passes through the slot $k^2$ in said plate. The slotted plate K is provided with a foot or projection, $k$, adapted to impinge against the pin $k'$ on the short arm of the index finger or lever E.

L is a roller adapted to bear against the interior surface of the tire, and secured to the slide G by means of the screw or pin $l$, on which it turns. The bar C is provided at its end with a pin, $c$, which may be inserted in a cavity in the shaft of the roll A', or fixed at some other point from which the measurements of the tire may be taken.

M is a slide provided with a dovetail guide, $m$, which fits in the dovetail groove or slideway $m'$ on the slide B.

N is an arm adjustably secured in the slide M by means of the set-screw $n$, and on which arm is mounted the roller P, which bears against the tread or exterior surface of the tire. The slide M is provided with a pin or projection, $m^2$, which fits in a slot, $m^3$, in the short arm of the index-lever F, by which said index-lever is operated to indicate on the dial-arc $d'$ the exterior diameter of the tire, while at the same time the index-lever E is moved by the projecting foot $k$ of the plate K, to indicate on the dial-arc $d$ the interior diameter of the tire, and the thickness of the tire is of course shown at the same time by the difference between the two.

The operation of my invention or manner of using it is as follows: The set-screw $b$ of the slide B is first loosened and the slide B moved along the rod C until the distance between the pin $c$ and the periphery of the roller L, plus the radius of the roll A', is equal to the interior diameter of the tire to be rolled. The slide B is then fixed in position by the set-screw $b$ and the point indicated by the index-finger E accurately marked on the dial-arc $d$. Of course it will be understood that at this time the projection $k$ of the slotted plate K is in contact with the pin $k'$ of the index-finger E. The set-screw $n$ is then loosened and the arm N moved in the slide M until the distance between the rollers P and L is equal to the thickness of the tire to be made, when said arm is fixed in position by the set-screw and the point indicated by the index-finger F accurately marked on the dial-arc $d'$. Now, as the slide M can move freely in the adjustable slide B, and as the slides G and G', which carry the plate K, can also slide freely on the rod C, the rollers L and P can be placed astride the tire at any time while it is being rolled, and the rollers being pressed against the tire by the operator pulling on the handle-rod H, the index-fingers E and F will indicate on the dial-arcs $d$ and $d'$ the interior and exterior diameters of the tire and its thickness. As the rolling proceeds and the diameters of the tire increase, the index-fingers E and F will approach the limit-marks previously made on the dial-arcs $d$ and $d'$. If the mark made on the dial-arc to indicate the exterior diameter of the tire should be reached very much the first, and the bloom prove too thick to make the intended tire, the rolling may be continued until the diameters of some other larger tire, also marked on the dial-arcs $d$ and $d'$, is reached. If, on the other hand, it should appear from the dial-fingers showing the thickness of the tire that the bloom is too small to produce the intended tire, the rolling may be discontinued when the diameters of some smaller tire are reached by the index-fingers. If preferred, the dial-arcs and the arm N may of course be graduated.

It will be observed that the rollers L and P, or the sliding arms on which they are mounted, do not impinge against fixed or rigid stops, but against a yielding spring-lever, the index-point of which gradually approaches the limit marked on the dial-arc, so that therefore by my invention a tire may be rolled much more accurately to any given diameter, exterior or interior, than by the method heretofore in use, where the roller-arm projects against a fixed stop. If necessary, the rolling may be slowed up as the tire reaches the required size.

The plate K is made slotted, so that it may slide or be adjusted on the handle-bar H, to adapt the apparatus to tires of different sizes.

The measurements may be taken from the center of the roll A, as indicated in the drawings, or from any other suitable point, as may be preferred.

In place of the friction-rollers L and P, the arm N and slide G may be made to press directly against the tire; but it is of course preferable to employ these friction-rollers.

The sensitiveness of the apparatus may be increased to any desired extent by increasing the length of the index-levers or of the long arms of the same.

I claim—

1. In a tire-rolling indicator, the combination of a device for indicating the interior diameter of the tire as it is being rolled with a device for simultaneously indicating its exterior diameter, substantially as specified.

2. The combination of a pair of index-fingers with movable slides or arms adapted to bear against the interior and exterior surfaces of the tire, and mechanism connecting said slides or arms with said index-fingers, so as to simultaneously indicate both the interior and exterior diameters of the tire, substantially as specified.

3. The combination of rod C, provided with pin $c$, adapted to be fixed at the center of the roll or other point from which measurements may be taken, and adjustable slide B, provided with dial-arcs $d$ and $d'$, index-levers E and F, pivoted to said slide, slide G, furnished with roller L, handle-bar H, and plate K, secured to slide G, for operating said index-lever E therefrom, slide M, mounted on slide B, and connected with index-lever F, rod N, and roller P, substantially as specified.

4. The combination, with rollers L and P, mounted on movable slides or arms and adapted to bear against the interior and exterior surfaces of the tire, of index-levers E and F, for indicating the interior and exterior diameters of the tire, and operated from said rollers L and P through suitable connecting rods or devices, substantially as specified.

5. In a tire-rolling indicator, the combination, with a roller adapted to bear against the surface of the tire and mounted on a movable slide, of a dial-arc and a movable index-lever connected with said movable slide to indicate the diameter of the tire, substantially as specified.

6. In a tire-rolling indicator, the combination of rod C, adjustable slide B, dial-arc $d$, index-lever E, slides G, provided with roller L, and means for operating said index-lever from said slide G, substantially as specified.

7. The combination of rollers L and P with movable slides or arms on which they are mounted, the index-levers E and F, dial-arcs $d$ and $d'$, and means for operating said index-levers from the movable slides or arms on which said rollers are mounted, substantially as specified.

JAMES MUNTON.

Witnesses:
H. M. MUNDAY,
T. EVERETT BROWN.